US008706805B2

(12) United States Patent
Radhakrishnan et al.

(10) Patent No.: US 8,706,805 B2
(45) Date of Patent: Apr. 22, 2014

(54) INFORMATION CACHING SYSTEM

(75) Inventors: Rajesh Radhakrishnan, Reston, VA (US); David E. Cox, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 13/330,078

(22) Filed: Dec. 19, 2011

(65) Prior Publication Data

US 2013/0159390 A1    Jun. 20, 2013

(51) Int. Cl.
*G06F 15/16* (2006.01)
(52) U.S. Cl.
USPC ............ 709/203; 709/219; 709/223; 709/224
(58) Field of Classification Search
USPC .................. 709/203, 219, 223, 224
See application file for complete search history.

(56) References Cited

U.S. PATENT DOCUMENTS

| | | | |
|---|---|---|---|
| 6,243,755 B1 | 6/2001 | Takagi et al. | |
| 7,716,332 B1 | 5/2010 | Topfl et al. | |
| 8,176,141 B1 * | 5/2012 | Lambert et al. | 709/212 |
| 8,326,923 B1 * | 12/2012 | Szabo et al. | 709/203 |
| 2002/0007404 A1 * | 1/2002 | Vange et al. | 709/217 |
| 2002/0062384 A1 * | 5/2002 | Tso | 709/229 |
| 2002/0138640 A1 * | 9/2002 | Raz et al. | 709/231 |
| 2004/0205149 A1 * | 10/2004 | Dillon et al. | 709/217 |
| 2004/0258053 A1 * | 12/2004 | Toporek et al. | 370/352 |
| 2004/0260769 A1 * | 12/2004 | Yamamoto | 709/203 |
| 2006/0271641 A1 * | 11/2006 | Stavrakos et al. | 709/217 |
| 2006/0294223 A1 * | 12/2006 | Glasgow et al. | 709/224 |
| 2008/0208789 A1 * | 8/2008 | Almog | 706/54 |
| 2008/0235239 A1 * | 9/2008 | Penton et al. | 707/10 |
| 2009/0287750 A1 * | 11/2009 | Banavar et al. | 707/204 |
| 2010/0281224 A1 * | 11/2010 | Ho et al. | 711/137 |

OTHER PUBLICATIONS

Zhao et al., "Cache Predicting Algorithm Based on Context-Aware in Pervasive Computing", 6th IEEE International/ACIS International Conference on Computer and Information Science (ICIS 2007), Jul. 2007, pp. 1-6.
Dias et al, "A Smart Internet Caching System", pp. 1-13, retrieved Jun. 25, 2010 isoc.org/inet96/proceedings/a4/a4_3.htm.
Liu et al., "A Reference Architecture for Self-organizing Service-Oriented Computing", Architecture of Computing Systems—ARCS 2008, Lecture Notes in Computer Science, 2008, vol. 4934/2008, pp. 205-219.

(Continued)

*Primary Examiner* — Liangche A Wang
*Assistant Examiner* — Johnny Aguiar
(74) *Attorney, Agent, or Firm* — Yee & Associates, P.C.; Arthur J. Samodovitz

(57) ABSTRACT

A method, data processing system, and computer program product for caching information. A computer determines whether at least one of a client data processing system and a hardware device in a plurality of hardware devices has performed a number of operations that have been identified as being associated with a request that is sent to a first hardware device in the plurality of hardware devices. The first hardware device is configured to obtain information from a second hardware device in the plurality of hardware devices for use in generating a response to the request. The computer caches the information in a cache for the plurality of hardware devices prior to a subsequent request for the information being sent to the first hardware device in response to a determination that the at least one of the client data processing system and the hardware device has performed the number of operations.

17 Claims, 8 Drawing Sheets

(56) References Cited

OTHER PUBLICATIONS

Solomon et al., "Towards a Real-Time Reference Architecture for Autonomic Systems", International Workshop on Software Engineering for Adaptive and Self Managing Systems, 2007, May 2007, pp. 1-10.

Brittenham et al., "IT service management architecture and autonomic computing", IBM Systems Journal, vol. 46 Iss. 3, 2007 pp. 565-581.

"An architectural blueprint for autonomic computing", IBM White Paper, vol. 36, 4th Ed. Jun. 2006, pp. 1-37.

* cited by examiner

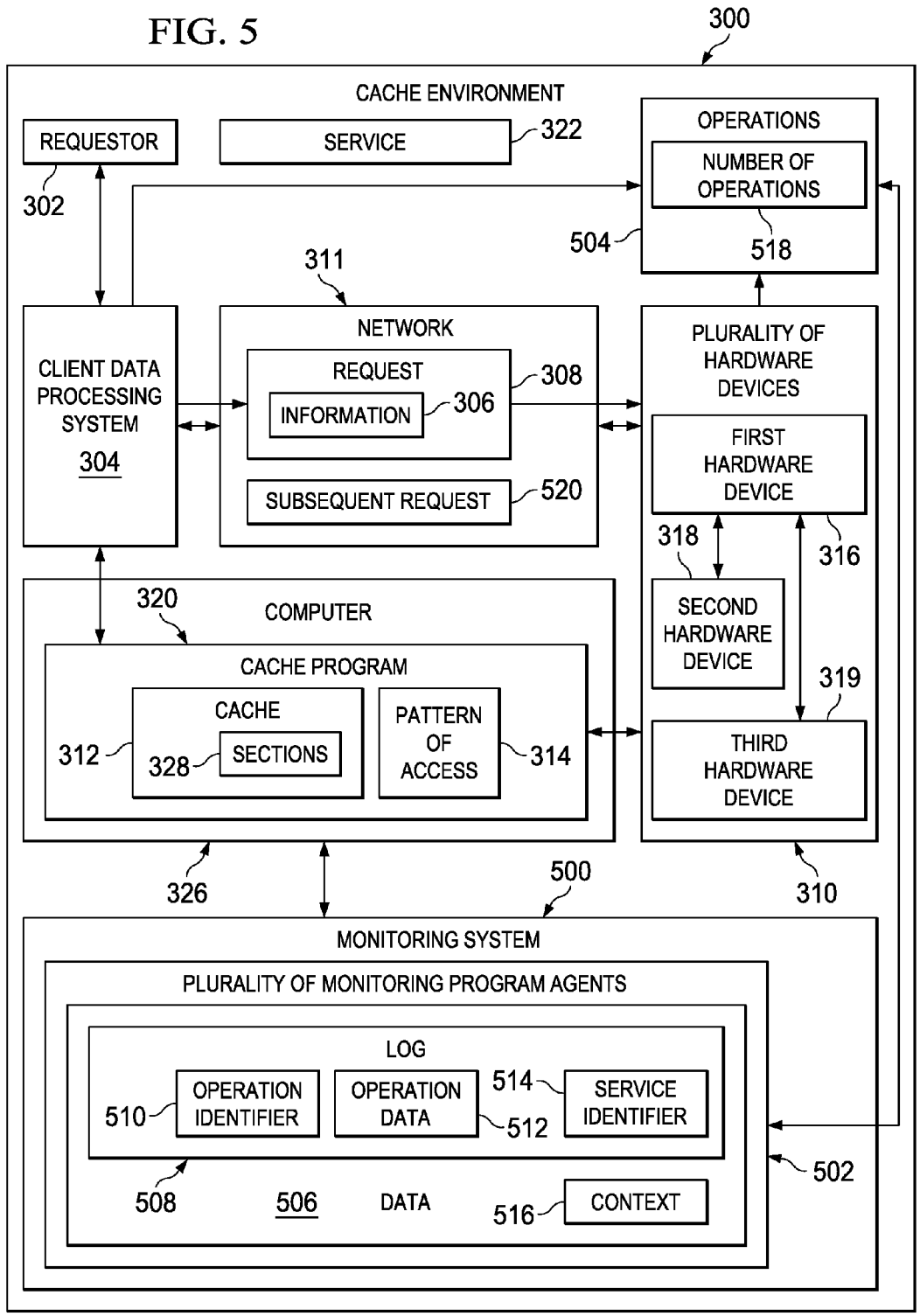

INFORMATION CACHING SYSTEM

BACKGROUND

1. Field

The present invention relates generally to an improved data processing system and, in particular, to a method and apparatus for processing information. Still more particularly, the present disclosure relates to a method and apparatus for caching information in a network data processing system.

2. Description of the Related Art

A cache memory is readily and rapidly accessible by a CPU and retains data that is likely to be needed later. Consequently, a cache improves performance in processing information in data processing systems, because future requests for the data can be satisfied and processed more quickly.

For example, the data in the cache may have been computed at an earlier time. Alternatively, the data in the cache may include duplicates of data that were previously retrieved from another storage location that is much slower to access than the cache. If this data is requested again at a later time and present in the cache, the request can be satisfied by reading the data from the cache. This process is faster than re-computing the data (even if the cache is disk storage) and faster than re-retrieving the data from the other storage location (if the cache, such as RAM or flash memory, is more readily and rapidly accessible than the other storage device).

As another example, if a user at a client computer requests a web page, a web server application may request the web page from storage or dynamically generate the web page from information in storage. This web page may then be stored in a cache at the web server. If the same web page is requested again, the web page may be more quickly accessed from the cache than from more slowly-accessible storage or by re-generating the web page. Even if the cache comprises disk storage, this will be more quickly available than if the web page has to be regenerated.

SUMMARY

The different illustrative embodiments provide a method, data processing system, and computer program product for caching information. A computer determines whether at least one of a client data processing system and a hardware device in a plurality of hardware devices has performed a number of operations. The number of operations has been identified as being associated with a request that is sent to a first hardware device in the plurality of hardware devices. The first hardware device is configured to obtain information from a second hardware device in the plurality of hardware devices for use by the first hardware device in generating a response to the request. The computer caches the information in a cache for the plurality of hardware devices prior to a subsequent request for the information being sent to the first hardware device in response to a determination that the at least one of the client data processing system and the hardware device in the plurality of hardware devices has performed the number of operations.

BRIEF DESCRIPTION OF THE SEVERAL VIEWS OF THE DRAWINGS

FIG. 5 is an illustration of a cache environment in accordance with an illustrative embodiment;

DETAILED DESCRIPTION

Figure 1:
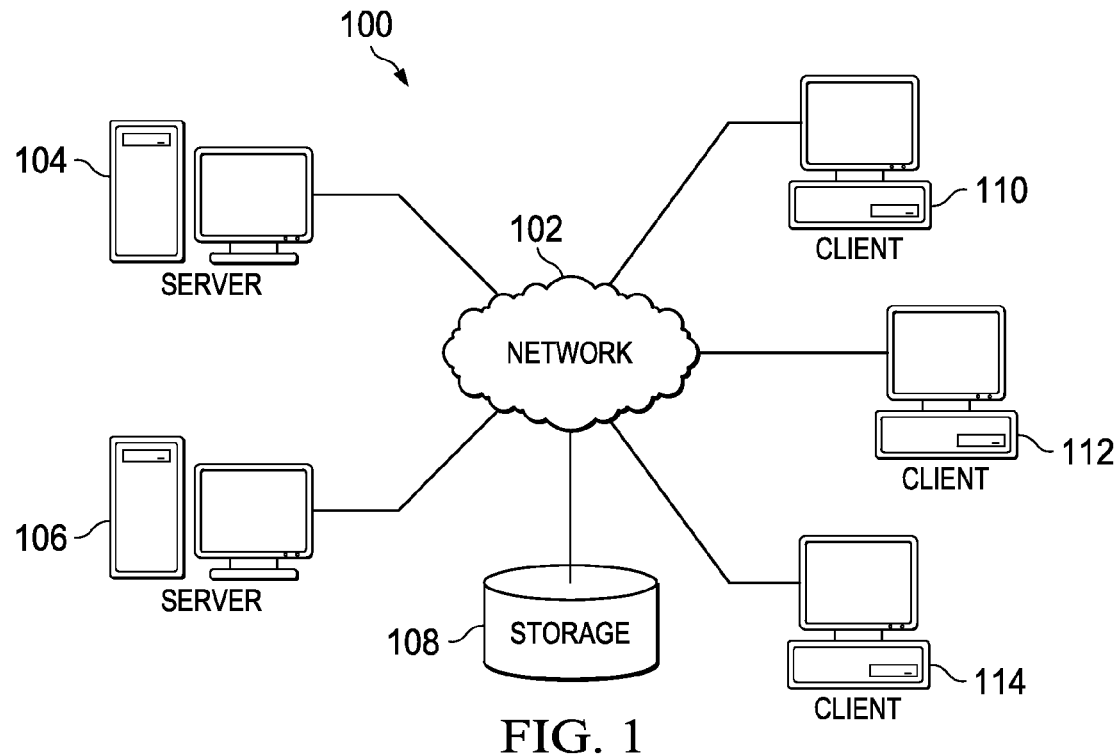
FIG. 1 is an illustration of a data processing environment in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) stored on a computer-readable, tangible storage device, or an embodiment combining software and hardware aspects that may all generally be referred to herein as a "circuit", "module", or "system." Furthermore, the present invention may take the form of a computer program product comprising computer-readable program code stored on a computer-readable, tangible storage device.

Any combination of one or more computer-readable, tangible storage device(s) may be utilized to store program code which implements the present invention when executed by a CPU via a RAM. The computer-readable, tangible storage device may be, for example, an electronic, magnetic, optical, electromagnetic, infrared, or semiconductor system, apparatus, or device. More specific examples (a non-exhaustive list) of the computer-readable, tangible storage device would include the following: a portable computer diskette, a hard disk, a random access memory (RAM), a read-only memory (ROM), an erasable programmable read-only memory (EPROM or Flash memory), a portable compact disk read-only memory (CDROM), an optical storage device, or a magnetic storage device.

The computer program can be stored on a fixed or portable computer-readable, tangible storage device or downloaded from the Internet via a network in which the network includes electrical, optical, and/or wireless communication links, routers, switches, etc.

Computer program code for carrying out operations of the present invention may be written in any combination of one or more programming languages, including an object-oriented programming language, such as Java, Smalltalk, C++, or the like, and conventional procedural programming languages, such as the "C" programming language or similar programming languages. The program code may run entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowcharts and/or block diagrams of methods, apparatus (systems), and computer program products according to embodiments of the invention. It will be understood that each block of the flowcharts and/or block diagrams, and combinations of blocks in the flowcharts and/or block diagrams, can be implemented by computer program instructions.

These computer program instructions may be provided to a processor of a general purpose computer, special purpose computer, or other programmable data processing apparatus via a computer-readable RAM such that the instructions, which execute via the processor of the computer or other programmable data processing apparatus, create means for implementing the functions/acts specified in the flowchart and/or block diagram block or blocks. These computer program instructions may also be stored in a computer-readable, tangible storage device that can direct a computer or other programmable data processing apparatus to function in a particular manner, such that the instructions stored in the computer-readable, tangible storage device produce an article of manufacture including instruction means, which implement the function/act specified in the flowchart and/or block diagram block or blocks.

The computer program instructions may also be loaded and installed onto a computer or other programmable data processing apparatus to cause a series of operational steps to be performed on the computer or other programmable apparatus to produce a computer-implemented process such that the instructions, which run on the computer or other programmable apparatus, provide processes for implementing the functions/acts specified in the flowchart and/or block diagram block or blocks.

With reference now to the figures and, in particular, with reference to FIG. 1, an illustration of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 is an illustration of a network of data processing systems in which illustrative embodiments may be implemented. Network data processing system 100 is a network of computers in which the illustrative embodiments may be implemented. Network data processing system 100 contains network 102, which provides communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, data processing systems, and other devices not shown.

Program code located in network data processing system 100 may be stored on a computer-recordable storage device and downloaded to a data processing system or other device for use. For example, program code may be stored on a computer-recordable storage device on server computer 104 and downloaded to client computer 110 over network 102 for use on client computer 110. One or more illustrative embodiments may be implemented to manage copies of data on network data processing system 100. In particular, one or more illustrative embodiments may be implemented to reduce the number of copies of data in a manner that reduces time needed to process requests for the data.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as, for example, an intranet, a cloud, a local area network (LAN), or a wide area network (WAN). FIG. 1 is intended as an example and not as an architectural limitation for the different illustrative embodiments.

Figure 2:
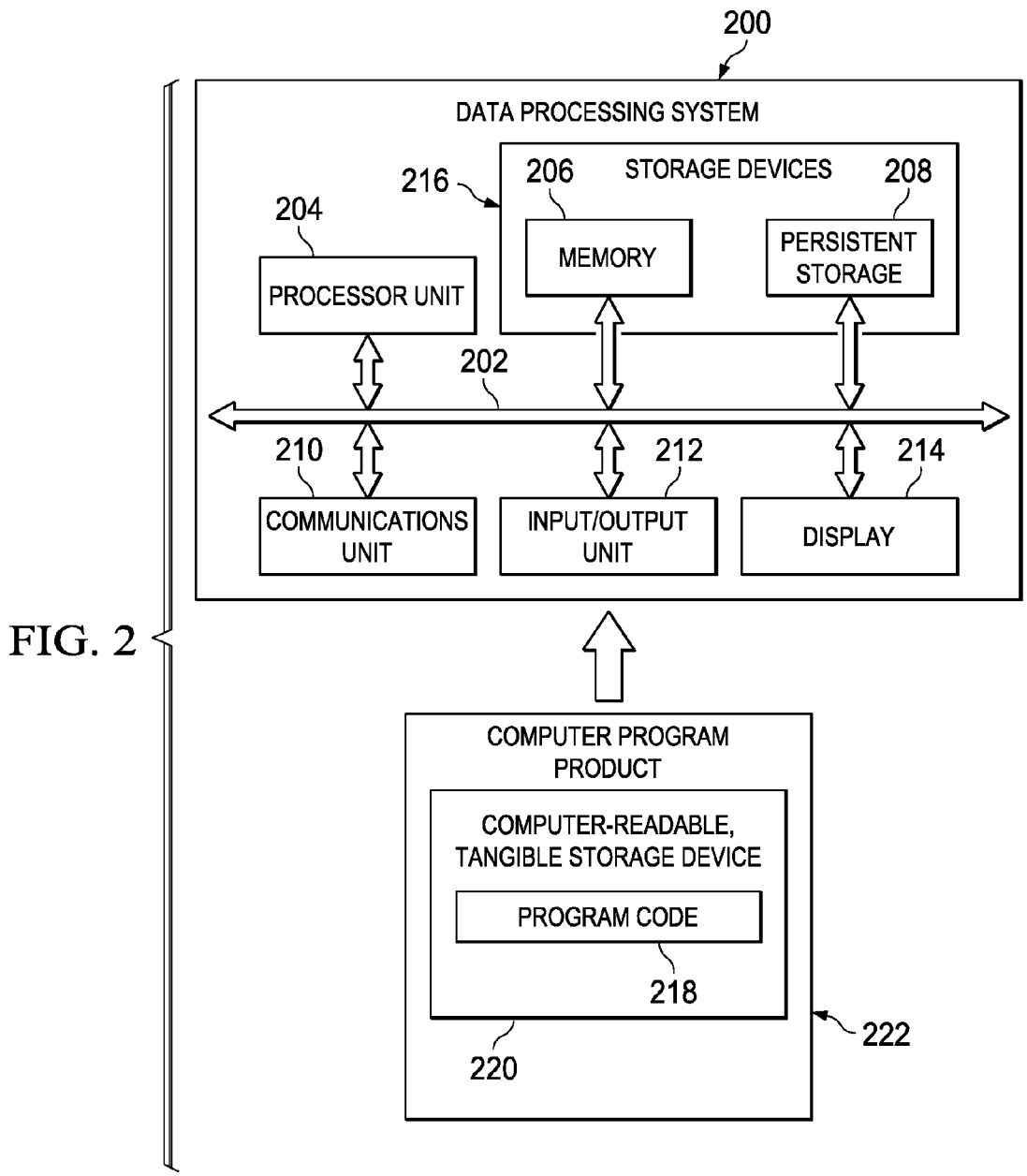
FIG. 2 is an illustration of a data processing system in accordance with an illustrative embodiment.

Turning now to FIG. 2, an illustration of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a central processing unit (CPU), a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware, such as disk storage, that is capable of storing information, such as, for example, without limitation, data, program code in functional form, and/or other suitable information either on a temporary basis and/or a permanent basis. Storage devices 216 may also be referred to as computer-readable, tangible storage devices in these examples. Memory 206, in these examples, may be, for example, a random access memory or any other suitable volatile or non-volatile storage device. Persistent storage 208 may take various forms, depending on the particular implementation. The terms "computer-readable, tangible storage device" and "computer-readable storage device" do not include signal propagation media such as a copper transmission cable, optical transmission fiber and wireless transmission media.

For example, persistent storage 208 may contain one or more components or devices. For example, persistent storage 208 may be a hard drive, a flash memory, a rewritable optical disk, a rewritable magnetic tape, or some combination of the above. Persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206.

These instructions are referred to as program code, computer-usable program code, or computer-readable program code that may be read and run by a processor in processor unit 204. The program code in the different embodiments may be embodied on different physical or computer-readable, tangible storage devices, such as memory 206 or persistent storage 208.

Program code 218 is located in a functional or interpretable form on computer-readable, tangible storage device 220 that is selectively removable and may be loaded onto or transferred to data processing system 200 for running by processor unit 204. Computer-readable, tangible storage device 220 may include, for example, an optical or magnetic disk that is inserted or placed into a drive or other device that is part of persistent storage 208 for transfer onto a storage device, such as a hard drive, that is part of persistent storage 208. Computer-readable, tangible storage device 220 also may take the form of a persistent storage, such as a hard drive, a thumb drive, or a flash memory, that is connected to data processing system 200. In some instances, computer-readable, tangible storage device 220 may not be removable from data processing system 200.

Alternatively, program code 218 may be transferred to data processing system 200 using communications links, such as wireless communications links, optical fiber cable, coaxial cable, a wire, and/or any other suitable type of communications link. In other words, the communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

As another example, a storage device in data processing system 200 is any hardware apparatus that may store data. Memory 206, persistent storage 208, and computer-readable, tangible storage device 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

The different illustrative embodiments recognize and take into account a number of different considerations. For example, the different illustrative embodiments recognize and take into account that current processes for caching information are focused on a particular resource. For example, with a disk cache, the process focuses on the storage system. With a web cache, the focus for caching information is on the web server. As another example, information in a CPU cache is focused on information used by the CPU.

The different illustrative embodiments recognize and take into account that current processes for caching information are focused on the particular resources as described above. The different illustrative embodiments recognize and take into account that these processes do not take into account that other resources may be involved in supplying the information in response to a request for the information. The current processes may not be as efficient when other resources involved in obtaining the information responsive to the request are not considered in identifying how to cache information.

The different illustrative embodiments also recognize and take into account that currently used processes for caching information only operate on information already requested. The different illustrative embodiments recognize and take into account that currently used processes do not take into account predicted steps that may be performed to obtain the information. In other words, the different illustrative embodiments recognize and take into account that the currently used processes for caching information do not take into account the end user behavior, usage patterns, service traffic, workflow, and other patterns of access that may be expected for a particular request.

For example, with a storage system, the different illustrative embodiments recognize and take into account that the process for caching information is based on patterns of access within the storage system. This type of cache process does not take into account patterns of access associated with the service being provided that uses the storage system.

Thus, the different illustrative embodiments provide a method and apparatus for caching information. In response to a request for the information from a client data processing system, a central processing unit determines a pattern of access for a plurality of hardware devices used to return the information to the client data processing system. The central processing unit caches the pattern of access for the plurality of hardware devices. Additionally, the process also may cache information for the plurality of hardware devices based on either a pattern of access for the plurality of hardware devices used to return the information to the client data processing system after the information has been returned to the client data processing system, or by predicting the pattern of access for the plurality of hardware devices that will be used to return the information to the client data processing system.

Figure 3:
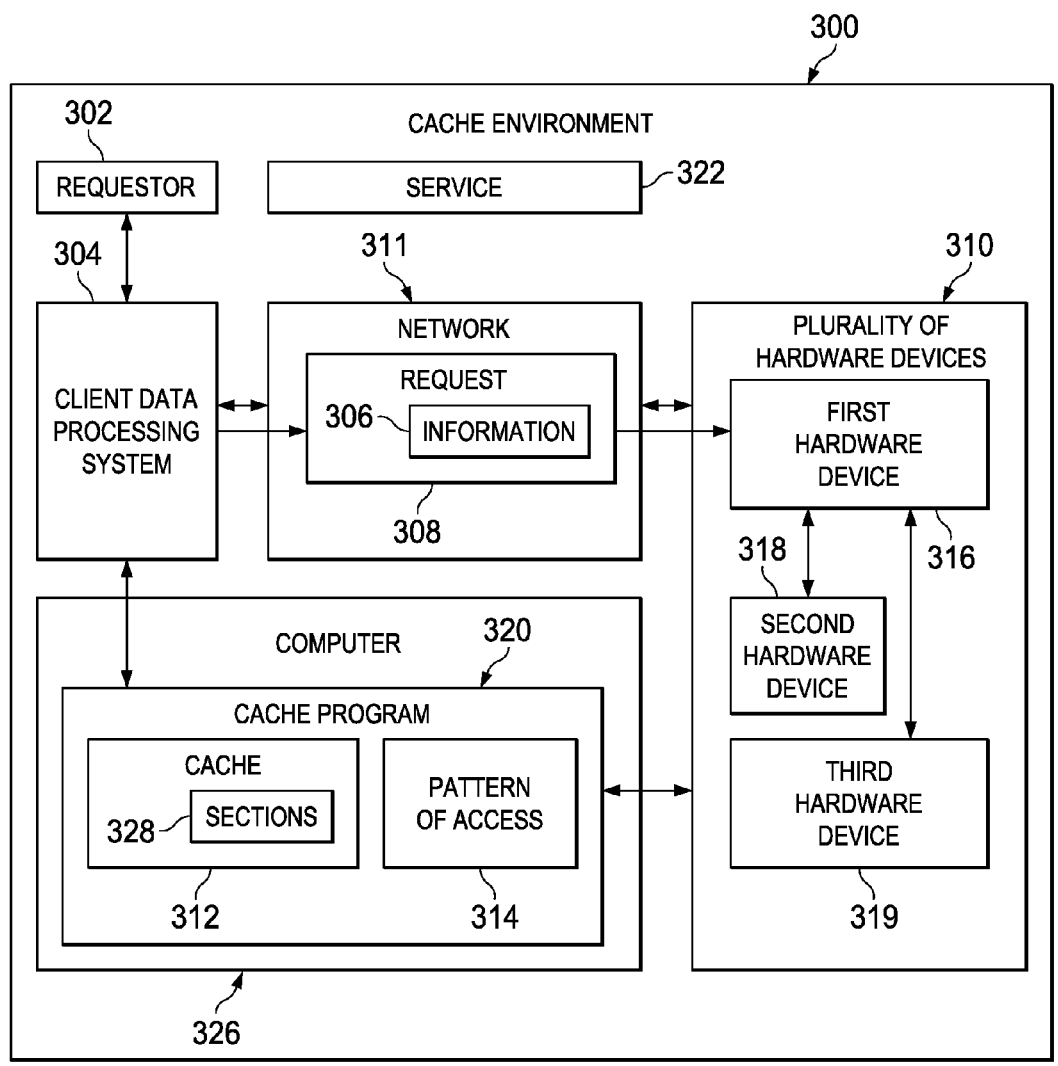
FIG. 3 is an illustration of a cache environment in accordance with an illustrative embodiment.

With reference now to FIG. 3, an illustration of a cache environment is depicted in accordance with an illustrative embodiment. In this illustrative example, cache environment 300 may be implemented using network data processing system 100 in FIG. 1.

In this illustrative example, requestor 302 at client data processing system 304 in cache environment 300 requests information 306 in request 308. Of course, depending on the implementation, request 308 may be some other suitable type of request. For example, request 308 may not be a request for information 306. In these illustrative examples, client data processing system 304 may take a number of different forms. Client data processing system 304 may be implemented using data processing system 200 in FIG. 2. Client data processing system 304 may be, for example, without limitation, a client computer, a laptop computer, a work station, a mobile phone, a tablet computer, and/or some other suitable type of data processing system.

In these illustrative examples, information 306 may take a number of different forms. For example, without limitation, information 306 may include at least one of a spreadsheet, a document, a web page, an image, a video, a command, a program, a file, and other suitable types of information.

In this illustrative example, request 308 is sent from client data processing system 304 to plurality of hardware devices 310. In response, plurality of hardware devices 310 returns information 306 to client data processing system 304. In other illustrative examples, request 308 may be sent to plurality of hardware devices 310 based on some operation or activity performed at client data processing system 304 other than requestor 302 generating request 308. For example, request 308 may be generated by client data processing system 304 in response to an operation that requires information 306 being initiated at client data processing system 304.

In these illustrative examples, client data processing system 304 is in communication with plurality of hardware devices 310 through network 311. In these illustrative examples, plurality of hardware devices 310 may comprise a number of different types of devices. For example, without limitation, plurality of hardware devices 310 may include a server computer, a proxy server computer, a storage system, a router, and other suitable types of devices.

In processing request 308, plurality of hardware devices 310 caches pattern of access 314 in cache 312. In these illustrative examples, computer 326 can use pattern of access 314 from cache 312 to facilitate and expedite obtaining of information 306 instead of the normal sequence of requests to plurality of hardware devices 310 to obtain information 306. For example, computer 326 may determine a subsequent request for information 306 is the same as a prior request for information 306 for which pattern of access 314 has been cached in cache 312. In this example, computer 326 may use pattern of access 314 to determine information 306 required for use by one or more devices in plurality of hardware devices 310. Further, in this example, computer 326 may direct one or more devices in plurality of hardware devices 310 to store and use information in cache 312 to expedite processing of the subsequent request.

More particularly, computer 326 may use pattern of access 314 to determine information 306 required for use by first hardware device 316 from second hardware device 318 before first hardware device 316 has received the subsequent request for information 306. In this illustrative example, computer 326 directs second hardware device 318 to cache the information needed by first hardware device 316 before first hardware device 316 has received the subsequent request for information 306. Directing second hardware device 318 to cache the information that will be requested by first hardware device 316 during the processing of the subsequent request by computer 326 expedites processing of the subsequent request by first hardware device 316 and second hardware device 318. In some cases, when request 308 is not a request for information 306, information 306 that is cached in cache 312 may be the information needed for use by first hardware device 316 in generating a response to request 308.

Cache 312 may be implemented using any storage device in these illustrative examples. In these illustrative examples, cache 312 may be in one location or multiple locations. Cache 312 may be at least one of a memory, a hard disk drive, a storage system, or some other suitable type of hardware.

In these illustrative examples, the cached information 306 indicates pattern of access 314 of data as recorded by plurality of hardware devices 310 including first hardware device 316 and second hardware device 318. Pattern of access 314 includes all the steps used to obtain information 306. Pattern of access 314 also may include the requests made to obtain information 306. Pattern of access 314 is a pattern of access for plurality of hardware devices 310 used to return information 306 to client data processing system 304 in these illustrative examples.

Pattern of access 314 may include traffic between client data processing system 304 and a set of hardware devices in plurality of hardware devices 310. A "set of" items, as used herein, means one or more items. For example, a set of hardware devices means one or more hardware devices. The traffic between client data processing system 304 may include, for example, any number of requests and/or responses sent from client data processing system 304 to a hardware device in plurality of hardware devices 310, sent from a hardware device in plurality of hardware devices 310 to client data processing system 304, and/or sent from a hardware device in plurality of hardware devices 310 to at least one other hardware device in plurality of hardware devices 310.

For example, pattern of access 314 is not limited to just the access request made by requestor 302 at client data processing system 304 to first hardware device 316 in plurality of hardware devices 310. Pattern of access 314 also includes requests made by first hardware device 316 to obtain information 306. For example, first hardware device 316 (such as an application server) may request some or all of information 306 from second hardware device 318 (such as a database server). In this illustrative example, pattern of access 314 encompasses requests made by both requestor 302 and by first hardware device 316. In this manner, caching of information 306 may take into account other resources other than just first hardware device 316 in these illustrative examples.

Pattern of access 314 may be identified by identifying the pattern of access for plurality of hardware devices 310 used to return information 306 to client data processing system 304 after the information has been returned to client data processing system 304. In other illustrative examples, cache program 320 may predict pattern of access 314. In other words, cache program 320 may predict pattern of access 314 for plurality of hardware devices 310 used to return information 306 to client data processing system 304. Cache program 320 runs on computer 326 in cache environment 300.

The prediction of pattern of access 314 may be performed in a number of different ways. For example, the prediction may be based on service 322 that is performed in response to request 308. For example, service 322 may be a database service, an email service, or some other suitable type of service. Based on the type of service requested, predictions can be made as to what information may be requested based on the service. In yet other illustrative examples, the prediction of pattern of access 314 may be based upon request 308 itself.

In these illustrative examples, cache 312 may be divided into sections 328 for allocation to plurality of hardware devices 310. For example, if plurality of hardware devices 310 includes two devices, one section of sections 328 may be assigned to first hardware device 316, while another section in sections 328 may be assigned to second hardware device 318.

The allocation of sections 328 may be identified based on increasing the performance in returning information 306 to client data processing system 304 in these illustrative examples. The different sections may encompass entire storage devices or may include portions of storage devices. For example, a section within sections 328 may encompass an entire hard disk drive in one illustrative example. In another example, a section may encompass a portion of main memory and a portion of hard disk drive.

The illustration of cache environment 300 in FIG. 3 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, cache program 320 may be implemented in other hardware devices other than computer 326. For example, cache program 320 may be implemented in plurality of hardware devices 310, depending on the particular implementation. Cache program 320 may be distributed between one or more of plurality of hardware devices 310, depending on the embodiment. In still other illustrative examples, cache program 320 may be implemented in client data processing system 304.

Additionally, in these illustrative examples, sections 328 may be for devices in plurality of hardware devices 310 and/or client data processing system 304. In other words, sections 328 may be distributed among plurality of hardware devices 310 and/or client data processing system 304, depending on the implementation. In this manner, cache program 320 may manage sections 328 of cache 312 on client data processing system 304 and/or plurality of hardware devices 310. In still other illustrative examples, plurality of hardware devices 310 may include third hardware device 319. Depending on the implementation, first hardware device 316, second hardware device 318, and third hardware device 319 may take the form of a first server computer, a second server computer, and a third server computer, respectively.

Figure 4:
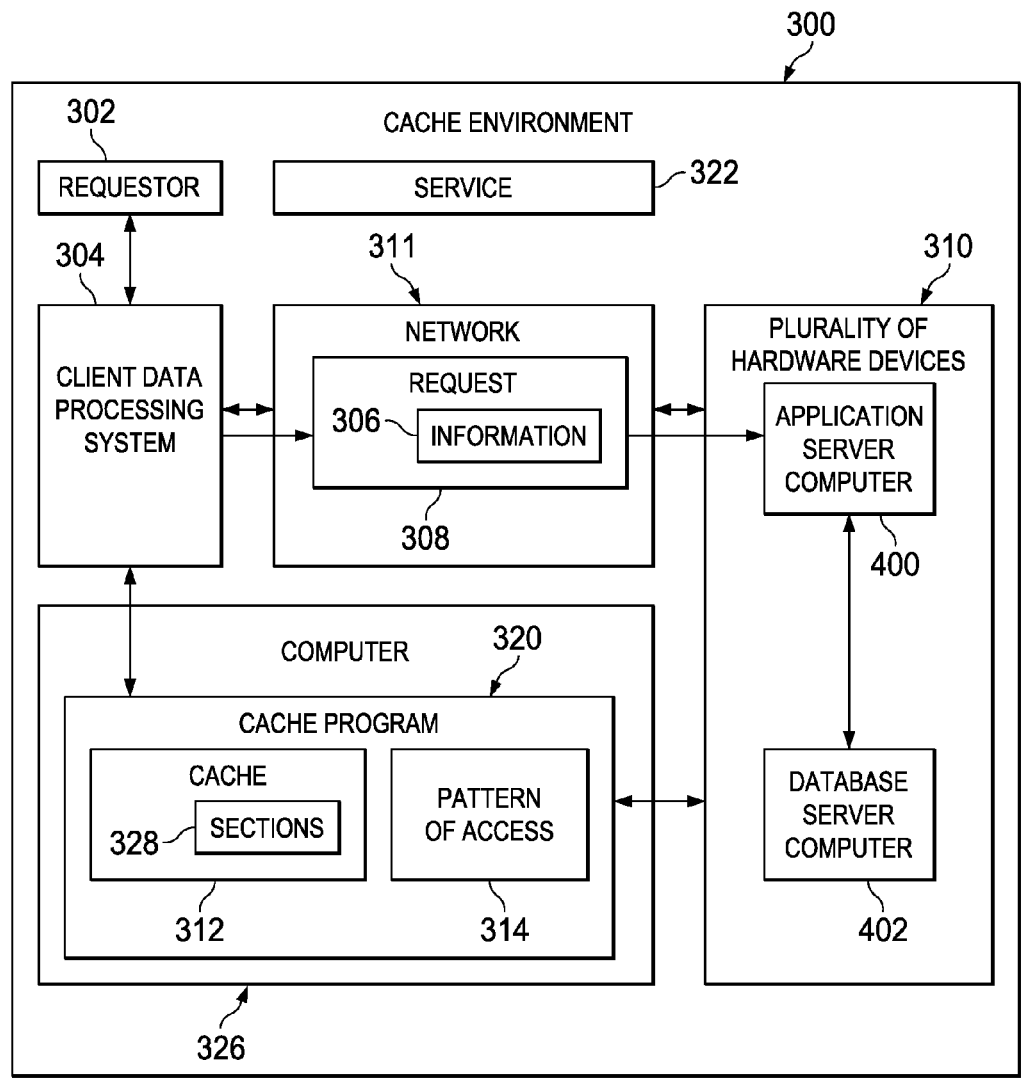
FIG. 4 is an illustration of a cache environment in accordance with an illustrative embodiment.

With reference now to FIG. 4, an illustration of a cache environment is depicted in accordance with an illustrative embodiment. In this illustrative example, an example of one implementation for cache environment 300 in FIG. 3 is depicted in accordance with an illustrative embodiment. In this example, cache environment 300 includes application server computer 400 and database server computer 402. Application server computer 400 and database server computer 402 receive request 308 over network 311 from requestor 302 at client data processing system 304.

In this illustrative example, requestor 302 sends request 308 to application server computer 400. In response, application server computer 400 processes request 308. In processing request 308, application server computer 400 contacts database server computer 402. Application server computer 400 receives at least some of information 306 from database server computer 402. Cache program 320 identifies pattern of access 314 from requestor 302 at client data processing system 304 all the way through database server computer 402. Based on pattern of access 314, cache program 320 caches information 306 in cache 312.

In these illustrative examples, cache program 320 may direct application server computer 400 to cache information 306 into a section of cache 312 in sections 328 for use by application server computer 400. In some illustrative examples, cache program 320 may direct database server computer 402 to cache information 306 into another section of cache 312 in sections 328 for use by database server computer 402.

Still further, cache program 320 may direct application server computer 400 to cache information 306 obtained from database server computer 402 into a section of cache 312 in sections 328. In this manner, information 306 requested in request 308 may be more easily and more quickly obtained from application server computer 400.

With reference now to FIG. 5, an illustration of a cache environment is depicted in accordance with an illustrative embodiment. In this illustrative example, an example of one implementation for cache environment 300 in FIG. 3 is depicted in accordance with an illustrative embodiment. In this example, cache environment 300 includes monitoring system 500.

In these illustrative examples, monitoring system 500 comprises plurality of monitoring program agents 502. Plurality of monitoring program agents 502 are processes that run on at least one of client data processing system 304, plurality of hardware devices 310, and computer 326. Plurality of monitoring program agents 502 are programmed to monitor operations 504 performed by client data processing system 304 and/or plurality of hardware devices 310.

Operations 504 may include any of a number of different types of operations. For example, operations 504 may include logging into an application, entering user input, closing out of an application, opening an application, creating a new file, and/or other suitable types of operations. In these illustrative examples, operations 504 may be monitored by plurality of monitoring program agents 502 configured to process information sent between components of data processing systems, such as data processing system 200 in FIG. 2, and information sent over a network between server computers, client computers, data processing systems, and other suitable devices of a networked data processing system, such as network data processing system 100 in FIG. 1.

Further, plurality of monitoring program agents 502 record data 506 about operations 504. In one illustrative example, data 506 may be recorded in log 508. Of course, in other illustrative examples, data 506 may be recorded in some other form, such as, for example, a database, a table, a spreadsheet, and/or some other suitable form.

In this depicted example, each entry in log 508 corresponds to an operation performed by client data processing system 304 and/or plurality of hardware devices 310. For each entry in log 508, log 508 includes operation identifier 510, operation data 512 about the operation, service identifier 514, and/or other suitable information.

In this illustrative example, operation identifier 510 identifies the operation corresponding to the entry in log 508. Operation data 512 includes information about the operation performed. For example, operation data 512 includes a time for when the operation is performed and/or other suitable information. Service identifier 514 identifies service 322 associated with the operation. For example, if the operation is logging into an email service, service identifier 514 identifies the email service.

As depicted in this example, cache program 320 obtains data 506 from monitoring system 500. Cache program 320 uses data 506 to identify pattern of access 314. As one illustrative example, pattern of access 314 may be identified based on context 516 for data 506. Context 516 may be, for example, service identifier 514 and/or other suitable information in or about the entry in log 508. Context 516 allows portions of data 506 to be identified such that pattern of access 314 can be identified. Context 516 can be generated by plurality of monitoring program agents 502. In these illustrative examples, context 516 is used to match operations with associated prior operations. For example, a first operation having context 516 that matches a subsequent related operation will be identified as a prior associated operation. In these illustrative examples, context 516 is also used to identify initiating operations. For example, an operation for which a prior operation with the same context 516 is not present will be identified as an initiating operation.

In these illustrative examples, an initiating operation means a first operation of a number of operations that started the number of operations. An example of an initiating operation is a user logging into a client computer. In another example, an initiating operation is a user starting an email program. In these illustrative examples, any client data processing operation that triggers a number of subsequent related operations in hardware devices associated with the client data processing operation is considered an initiating operation. In still another example, if an initiating operation has a particular transaction identifier, a second transaction having the same transaction identifier would be considered a subsequent related operation.

For example, context 516 may allow a set of related entries in log 508 to be identified. The set of related entries may be used to identify pattern of access 314. Pattern of access 314 may be, for example, request 308 for information 306 being generated in response to number of operations 518 in operations 504 being performed within a threshold period of time. In this manner, number of operations 518 is associated with request 308. Pattern of access 314 predicts that a subsequent request that is the same as request 308, such as subsequent request 520, will occur after number of operations 518 has been performed within the threshold period of time.

Using pattern of access 314, cache program 320 caches information 306 into cache 312 in response to number of operations 518 being performed within the selected period of time and prior to subsequent request 520 for information 306 being sent from client data processing system 304. Subsequent request 520 is a request that is sent from client data processing system 304 to plurality of hardware devices 310 subsequent to request 308 and after pattern of access 314 is identified.

In this manner, when subsequent request 520 for information 306 is sent by client data processing system 304 to plurality of hardware devices 310, information 306 may be more quickly and easily obtained from cache 312 for plurality of hardware devices 310 as compared to when information 306 is not already stored in cache 312.

Figure 6:
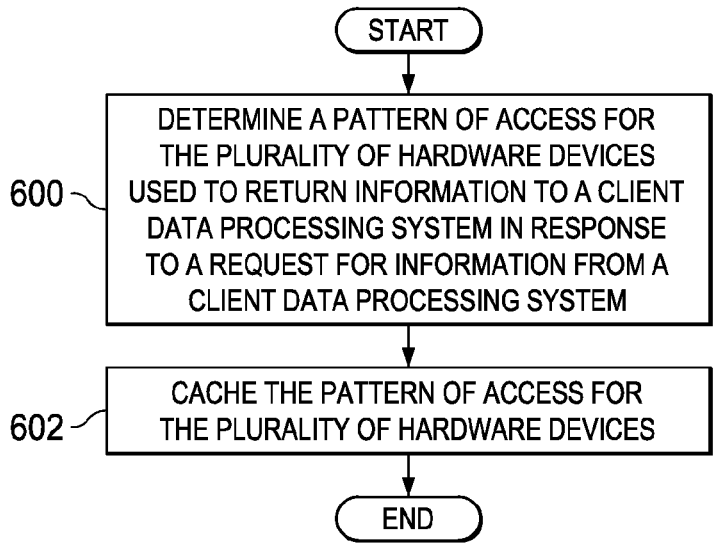
FIG. 6 is an illustration of a flowchart of a process for caching information in accordance with an illustrative embodiment.

With reference now to FIG. 6, an illustration of a flowchart of a process for caching information is depicted in accordance with an illustrative embodiment. The process illustrated in FIG. 6 may be implemented in cache environment 300 in FIG. 3 and/or cache environment 300 in FIG. 4. In particular, this process may be implemented using cache program 320 in FIG. 3 and/or FIG. 4.

The process begins by cache program 320 determining pattern of access 314 for plurality of hardware devices 310 used to return information 306 to client data processing system 304 in response to request 308 for information 306 from client data processing system 304 (step 600). In step 600, cache program 320 determines pattern of access 314 using, for example, data 506 generated by monitoring system 500 in FIG. 5.

Thereafter, cache program 320 caches pattern of access 314 for plurality of hardware devices 310 (step 602), with the process terminating thereafter. In step 602, cache program 320 caches pattern of access 314 into cache 312. Cache 312 may have sections 328 associated with devices in plurality of hardware devices 310.

Figure 7:
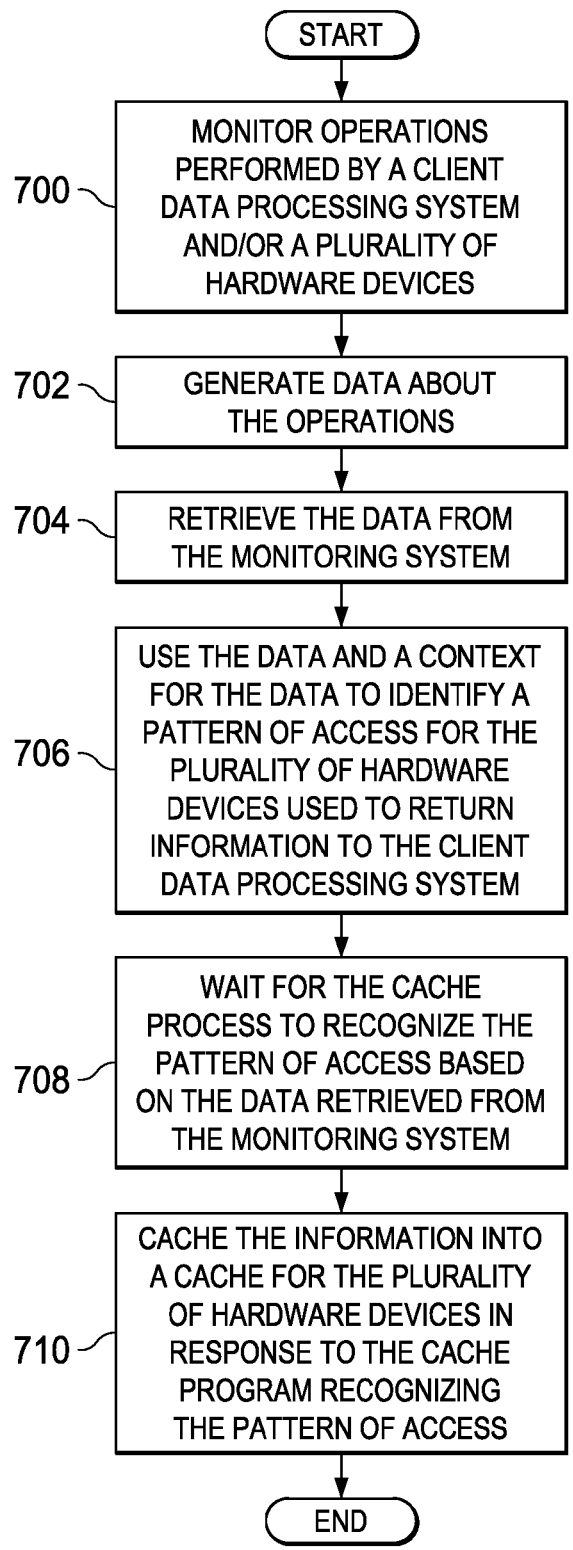
FIG. 7 is an illustration of a flowchart of a process for caching information in accordance with an illustrative embodiment.

With reference now to FIG. 7, an illustration of a flowchart of a process for caching information is depicted in accordance with an illustrative embodiment. The process illustrated in FIG. 7 may be implemented in cache environment 300 in FIG. 3 and/or cache environment 300 in FIG. 4. In particular, this process may be implemented using cache program 320 in FIG. 3 and/or FIG. 4. Additionally, this process may also be implemented using monitoring system 500 in FIG. 5.

The process begins by plurality of monitoring program agents 502 monitoring operations 504 performed by client data processing system 304 and/or plurality of hardware devices 310 (step 700). Operations 504 include, in these illustrative examples, the sending of request 308 for information 306 by client data processing system 304 to plurality of hardware devices 310. Plurality of monitoring program agents 502 generates data 506 about operations 504 (step 702). In this illustrative example, the monitoring program agents generate data 506 in the form of log 508.

Thereafter, cache program 320 retrieves data 506 from monitoring system 500 (step 704). In these illustrative examples, cache program 320 retrieves data 506 continuously. In some illustrative examples, cache program 320 retrieves data 506 in response to an event occurring. For example, cache program 320 may be configured to retrieve data 506 in response to a periodic event, such as the lapse of a selected period of time.

Cache program 320 uses data 506 and context 516 for data 506 to identify pattern of access 314 for plurality of hardware devices 310 used to return information 306 to client data processing system 304 (step 706). Step 706, in these examples, is performed after information 306 is sent from plurality of hardware devices 310 to client data processing system 304 in response to request 308. In step 706, cache program 320 identifies pattern of access 314 by predicting pattern of access 314 based on data 506 and context 516 for data 506. Next, cache program 320 waits for cache program 320 to recognize pattern of access 314 based on data 506 retrieved from monitoring system 500 (step 708). In step 708, cache program 320 recognizes pattern of access 314 when data 506 that is being continuously retrieved from monitoring system 500 indicates that operations performed by client data processing system 304 and/or plurality of hardware devices 310 form pattern of access 314.

In response to cache program 320 recognizing pattern of access 314, cache program 320 caches information 306 into cache 312 for plurality of hardware devices 310 (step 710), with the process terminating thereafter. In step 710, information 306 is cached into cache 312 after pattern of access 314 is recognized and prior to a subsequent request for information 306, such as subsequent request 520, being sent from client data processing system 304 to plurality of hardware devices 310. In this manner, information 306 may be returned to client data processing system 304 more quickly and easily in response to subsequent request 520 as compared to request 308.

Figure 8:
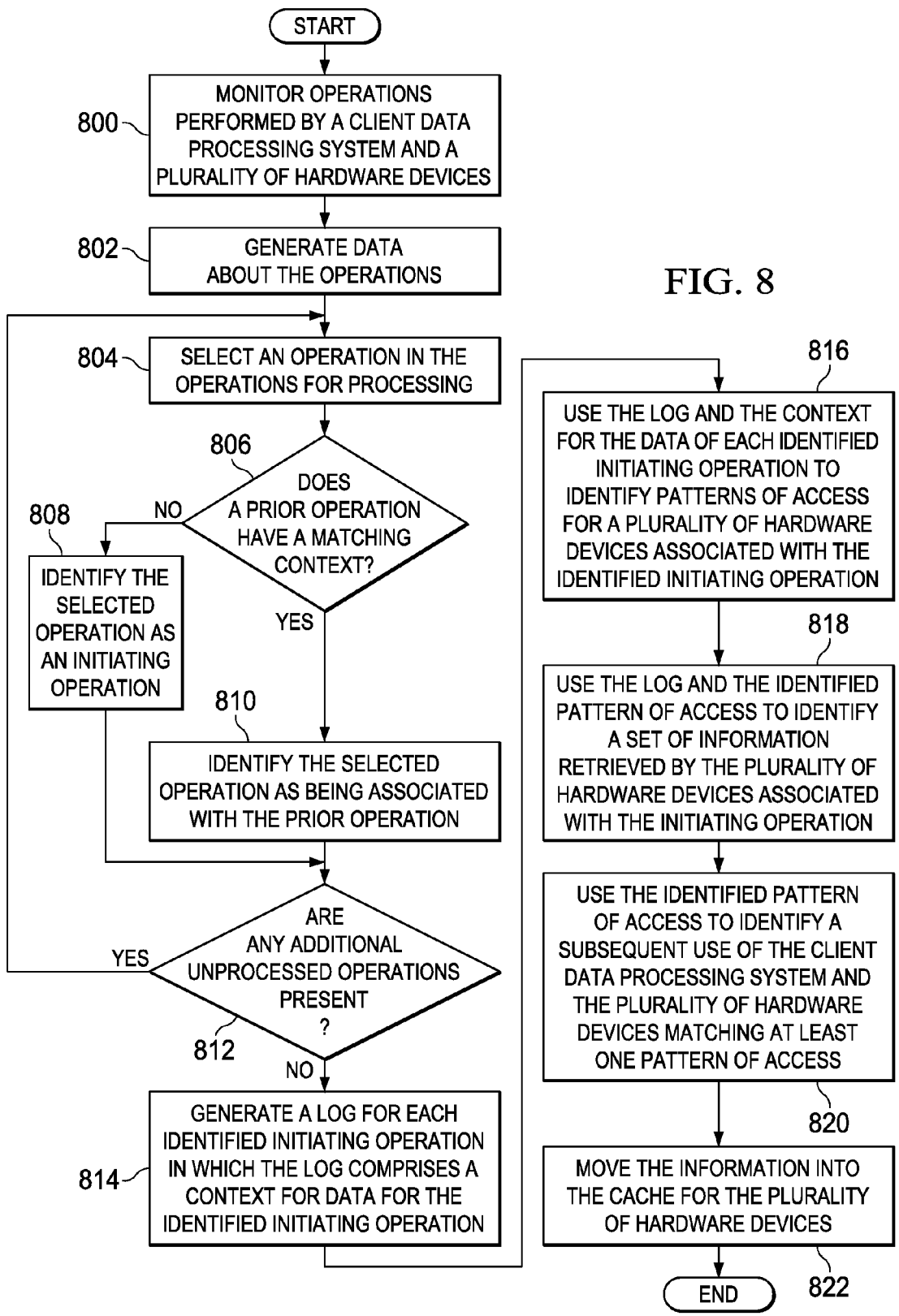
FIG. 8 is an illustration of a flowchart of a process for caching information in accordance with an illustrative embodiment.

With reference now to FIG. 8, an illustration of a flowchart of a process for caching information is depicted in accordance with an illustrative embodiment. The process illustrated in FIG. 8 may be implemented in cache environment 300 in FIG. 3 and/or cache environment 300 in FIG. 4. In particular, this process may be implemented using cache program 320 in FIG. 3 and/or FIG. 4. Additionally, this process may also be implemented using monitoring system 500 in FIG. 5.

The process begins by plurality of monitoring program agents 502 monitoring operations 504 performed by client data processing system 304 and plurality of hardware devices 310 (step 800). Operations 504 include, in these illustrative examples, the sending of request 308 for information 306 by client data processing system 304 to plurality of hardware devices 310. Thereafter, plurality of monitoring program agents 502 generates data 506 about operations 504 (step 802). Data 506 about operations 504 may include, for example, context 516, which identifies operations 504.

Cache program 320 then selects an operation in operations 504 for processing (step 804). Cache program 320 determines whether a prior operation that is prior to the selected operation has matching context 516 (step 806). If a prior operation that is prior to the selected operation does not have matching context 516, cache program 320 identifies the selected operation as an initiating operation (step 808). The process then continues to step 812 described below. With reference again to step 806, if a prior operation that is prior to the selected operation has matching context 516, cache program 320 identifies the selected operation as being associated with the prior operation (step 810). The process then continues to step 812 as described below.

Cache program 320 determines whether any additional unprocessed operations in operations 504 are present (step 812). If additional unprocessed operations are present, the process returns to step 804 as described above. Otherwise, the process continues with cache program 320 generating log 508 for each identified initiating operation in which log 508 comprises context 516 for data 506 for the identified initiating operation (step 814).

Cache program 320 uses log 508 and context 516 for data 506 of each identified initiating operation to identify patterns of access, such as pattern of access 314, for plurality of hardware devices 310 associated with the identified initiating operation (step 816). Step 816, in these examples, is performed after information 306 is sent from plurality of hardware devices 310 to client data processing system 304 in response to request 308. In particular, in step 816, cache program 320 identifies pattern of access 314 by predicting pattern of access 314 based on log 508 and context 516 for data 506.

Next, cache program 320 uses log 508 and the identified pattern of access 314 to identify a set of information, such as information 306, retrieved by plurality of hardware devices 310 that is associated with the initiating operation (step 818). The set of information is associated with the initiating operation when the set of information is retrieved by plurality of hardware devices 310 in operations associated with the initiating operation.

Cache program 320 then uses the identified pattern of access 314 to identify a subsequent use of client data processing system 304 and plurality of hardware devices 310 matching at least one pattern of access (step 820). In step 820, cache program 320 identifies a subsequent use of client data processing system 304 and plurality of hardware devices 310 as matching pattern of access 314 when log 508 indicates that operations performed by client data processing system 304 and plurality of hardware devices 310 form pattern of access 314.

In response to cache program 320 identifying a subsequent use of client data processing system 304 and plurality of hardware devices 310 as matching at least one pattern of access, cache program 320 moves information 306 into cache 312 for plurality of hardware devices 310 (step 822), with the process terminating thereafter. In step 822, information 306 is moved into cache 312 after pattern of access 314 is recognized and prior to a subsequent request for information 306, such as subsequent request 520, being sent from client data processing system 304 to plurality of hardware devices 310. In this manner, information 306 may be returned to client data processing system 304 more quickly and easily in response to subsequent request 520 as compared to request 308.

For example, an identified pattern of access 314 may include a user logging into a banking application as an initiating operation. In this example, cache program 320 further identifies that the banking application loads account information for the user in response to a request for this account information. In particular, cache program 320 identifies that the banking application loads the account information for the user within a particular period of time after the user has logged into the banking application.

As a result, cache program 320 configures the cache to move the account information for the user to the cache each time the user logs into the banking application within the particular period of time. In other words, each time the user logs into the banking application, cache program 320 moves the account information for the user to the cache before the particular period of time after the user has logged into the banking application elapses. In this manner, cache program 320 moves the account information for the user to the cache in anticipation of the request for the account information.

Figure 9:
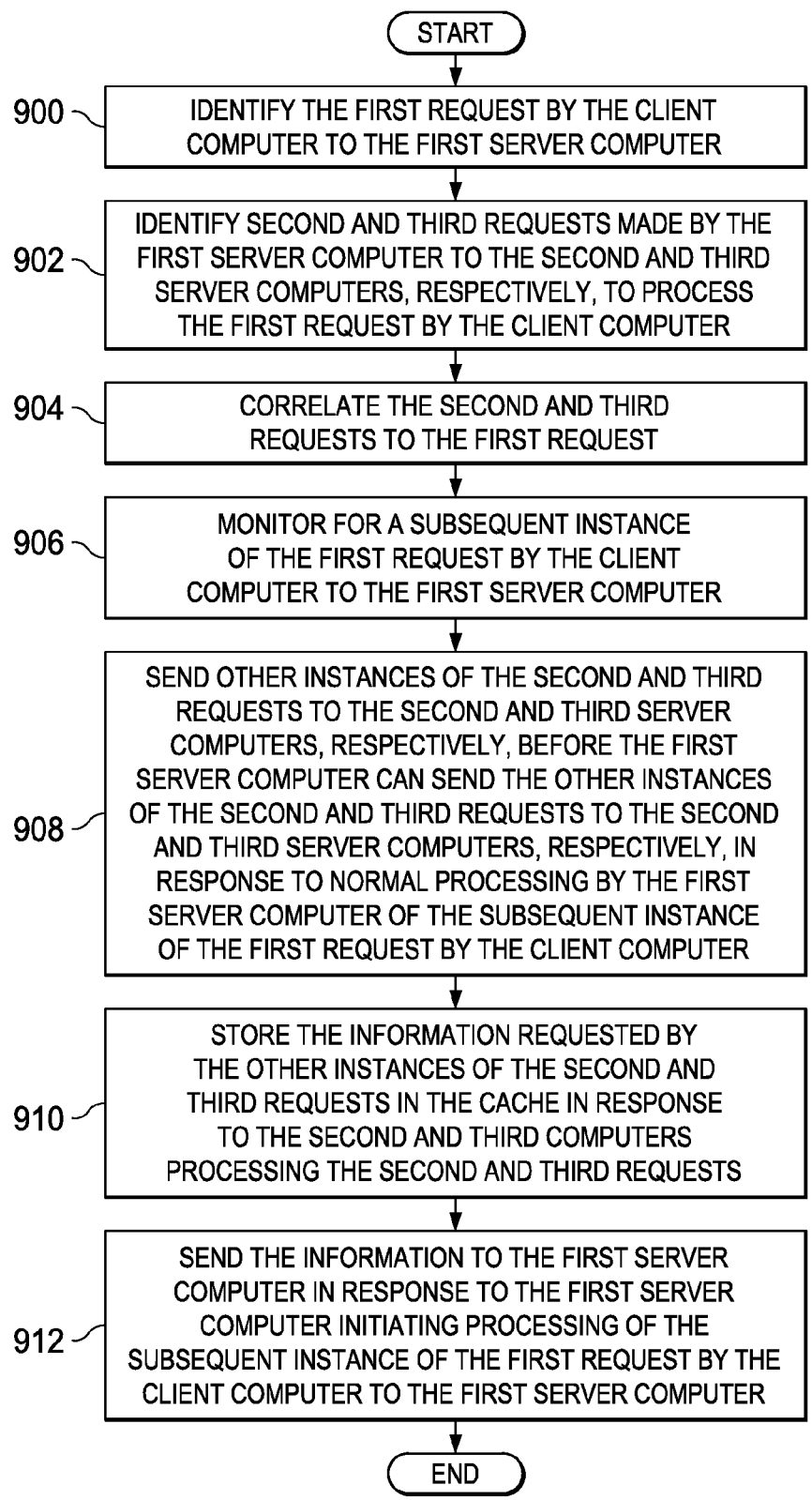
FIG. 9 is an illustration of a flowchart of a process for expediting processing of a request by a client computer in accordance with an illustrative embodiment.

With reference now to FIG. 9, an illustration of a flowchart of a process for expediting processing of a request by a client computer is depicted in accordance with an illustrative embodiment. The process illustrated in FIG. 9 may be implemented in cache environment 300 in FIG. 5 using client data processing system 304 in the form of a client computer, first hardware device 316 in the form of a first server computer, second hardware device 318 in the form of a second server computer, third hardware device 319 in the form of a third server computer, and computer 326.

Further, this process may be implemented to expedite processing of request 308 by the client computer to the first server computer. Request 308 may be a first request in a series of requests generated to obtain the information requested by request 308.

Computer 326 identifies the first request by the client computer to the first server computer (step 900). Computer 326 then identifies second and third requests made by the first server computer to the second and third server computers, respectively, to process the first request by the client computer (step 902). Computer 326 may perform step 902 using data retrieved from monitoring system 500 in FIG. 5. This data may take the form of a log containing entries corresponding to operations performed by at least one of the client computer, the first server computer, and the second and third server computers.

For example, as an application in computer 326 called by the client computer processes an original request from the client computer, each subsequent request made by the called application in computer 326 or by a related application in computer 326 to another application in another computer made during the processing of the original request is indexed by an identifier, such as the session ID of the session with the client computer. Computer 326 logs the original request from the client computer and the subsequent requests to the other computers, which occur during processing of the original request from the client computer, and indexes the original request and the subsequent requests with the common identifier. Thus, the log records all of the subsequent requests to the other computers and correlates them to the original client request to computer 326 via the common identifier.

Next, computer 326 correlates the second and third requests to the first request (step 904). Computer 326 monitors for a subsequent instance of the first request by the client computer to the first server computer (step 906). In some cases, this subsequent instance may be, for example, subsequent request 520 in FIG. 5. In response to a subsequent instance of the first request by the client computer to the first server computer, based on the correlation of the second and third requests to the first request as recorded in the log, computer 326 sends other instances of the second and third requests to the second and third server computers, respectively, before the first server computer can send the other instances of the second and third requests to the second and third server computers, respectively, in response to normal processing by the first server computer of the subsequent instance of the first request by the client computer (step 908).

For example, if the original request to an application in computer 326 will ultimately elicit from the application a responsive web page that includes or is based on data that needs to be obtained dynamically from other database servers, computer 326 will request this data from the database servers upon receipt of the client request based on the logged information before the application would normally make these requests to the database servers pursuant to normal processing of the client request. Computer 326 puts the data in the cache for the application before the application requests the data from the database servers so that the application will not repeat the requests to the database servers. In this manner, in step 908, processing of the subsequent instance of the first request by the client computer is expedited.

Computer 326 then stores the information requested by the other instances of the second and third requests in cache 312 in response to the second and third computers processing the second and third requests (step 910). Thereafter, computer 326 sends the information to the first server computer in response to the first server computer initiating processing of the subsequent instance of the first request by the client computer to the first server computer (step 912), with the process terminating thereafter. Step 912 may be performed before the first server computer can send the other instances of the second and third requests to the second and third server computers. In this manner, processing of the subsequent instance of the first request by the client computer to the first server computer may be expedited.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts or combinations of special purpose hardware and computer instructions.

Thus, the different illustrative embodiments provide a method and apparatus for caching information. In response to a request for the information from a client data processing system, a central processing unit identifies a pattern of access for a plurality of hardware devices used to return the information to the client data processing system. The central processing unit caches information for the plurality of hardware devices using the pattern of access. Additionally, the process also may cache information for the plurality of hardware devices based on either a pattern of access for the plurality of hardware devices used to return the information to the client data processing system after the information has been returned to the client data processing system or by predicting the pattern of access for the plurality of hardware devices that will be used to return the information to the client data processing system.

The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output, or I/O devices (including, but not limited to, keyboards, displays, pointing devices, etc.), can be coupled to the system either directly or through intervening I/O controllers.

Network adapters may also be coupled to the system to enable the data processing system to become coupled to other data processing systems, remote printers, or storage devices through intervening private or public networks. Modems, cable modem, and Ethernet cards are just a few of the currently available types of network adapters.

The description of the present invention has been presented for purposes of illustration and description and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for expediting processing of a request by a client computer, the method comprising the steps of:
   responsive to a first request by the client computer to a first server computer, one or more processors identifying second and third requests made by the first server computer to second and third server computers, respectively, to process the first request by the client computer to the first server computer, wherein the second request is for data that is generated dynamically in response to the second request, the data being needed to process the first request;
   in response to the identification, the one or more processors correlating the second and third requests to the first request;
   responsive to a subsequent instance of the first request by the client computer to the first server computer, and based on the correlation of the second and third requests to the first request, the one or more processors sending another instance of the second request to the second server computer to dynamically generate data needed to process the first request and another instance of the third request to the third server computer, before the first server computer is able to send the other instances of the second and third requests to the second and third server computers, respectively, in response to processing by the first server computer of the subsequent instance of the first request by the client computer without the correlation of the second and third requests to the first request performed previously in response to the identification, to expedite processing of the subsequent instance of the first request made by the client computer; and
   the one or more processors receiving information from the second and third server computers in response to the other instances of the second and third requests, respectively, and sending the information to the first server computer to expedite the processing of the subsequent instance of the first request.

2. The method of claim 1, further comprising:
   a monitoring system monitoring operations performed by at least one of the client computer, the first server computer, and the second and third server computers; and
   the monitoring system recording data about the operations performed by the at least one of the client computer, the first server computer, and the second and third server computers.

3. The method of claim 2, wherein the step of the one or more processors identifying the second and third requests made by the first server computer to the second and third server computers, respectively, to process the first request by the client computer to the first server computer in response to the first request by the client computer to the first server computer comprises:
   the one or more processors retrieving the data from the monitoring system; and
   the one or more processors identifying the second and third requests made by the first server computer to the second and third server computers, respectively, to process the first request by the client computer to the first server computer in response to the first request by the client computer to the first server using the data retrieved from the monitoring system and context for the data.

4. The method of claim 2, wherein the step of the monitoring system recording the data about the operations performed by the at least one of the client computer, the first server computer, and the second and third server computers comprises:
   the monitoring system recording the data about the operations performed by the at least one of the client computer, the first server computer, and the second and third server computers in a log in which each entry in the log corresponds to an operation performed by one of the at least one of the client computer, the first server computer, and the second and third server computers.

5. The method of claim 4, wherein the step of the one or more processors identifying the second and third requests made by the first server computer to the second and third server computers, respectively, to process the first request by the client computer to the first server computer in response to the first request by the client computer to the first server computer comprises:
   the one or more processors retrieving the log from the monitoring system; and
   the one or more processors identifying a set of related entries recorded in the log using context for the each entry in the log in which the set of related entries correspond to the second and third requests.

6. The method of claim 5, wherein the step of the one or more processors correlating the second and third requests to the first request comprises:
   the one or more processors correlating the second and third requests that correspond to the set of related entries to the first request to form a pattern of access for the first server computer and the second and third server computers in which the pattern of access predicts that the other instances of the second and third requests will be sent to the second and third server computers, respectively, to process the first request by the client computer to the first server computer in response to the first request by the client computer to the first server computer.

7. The method of claim 4, wherein the step of the monitoring system recording the data about the operations performed by the at least one of the client computer, the first server computer, and the second and third server computers in the log comprises:
   the monitoring system recording an operation identifier, operation data, and a service identifier in the each entry in the log.

8. The method of claim 2, wherein the step of the one or more processors identifying the second and third requests made by the first server computer to the second and third server computers, respectively, to process the first request by the client computer to the first server computer in response to the first request by the client computer to the first server computer comprises:
   the one or more processors retrieving the data from the monitoring system;
   the one or more processors determining whether the second and third requests occur within a threshold period of time from a time at which the first request is received by the first server computer and whether the second and third requests by the first server computer to the second and third server computers request information for use in processing the first request by the client computer to the first server computer; and responsive to at least one of a determination that the second and third requests occur within the threshold period of time from the time at which the first request is received by the first server computer and a determination that the second and third requests by the first server computer to the second and third server computers request the information for use in processing the first request by the client computer to the first server computer, the one or more processors identifying the second and third requests made by the first server computer to the second and third server computers as part of the processing by the first server computer of the first request by the client computer to the first server computer.

9. A data processing system for expediting processing of a request by a client computer, the data processing system comprising:

a CPU, a computer-readable storage device, and a computer-readable memory;

first program instructions to identify second and third requests made by a first server computer to second and third server computers, respectively, to process a first request by the client computer to the first server computer in response to the first request by the client computer to the first server computer, wherein the second request is for data that is generated dynamically in response to the second request, the data being needed to process the first request;

second program instructions to correlate the second and third requests to the first request in response to the identification;

third program instructions to send another instance of the second request to the second server computer to dynamically generate data needed to process the first request and another instance of the third request to the third server computer, before the first server computer is able to send the other instances of the second and third requests to the second and third server computers, respectively, in response to processing by the first server computer of a subsequent instance of the first request by the client computer without the correlation of the second and third requests to the first request performed previously in response to the identification, to expedite processing of the subsequent instance of the first request made by the client computer responsive to the subsequent instance of the first request by the client computer to the first server computer, and based on the correlation of the second and third requests to the first request; and fourth program instructions to receive information from the second and third server computers in response to the other instances of the second and third requests, respectively, and send the information to the first server computer to expedite the processing of the subsequent instance of the first request, wherein the first, the second, the third, and the fourth program instructions are stored on the computer-readable storage device for execution by the CPU in the computer-readable memory.

10. The data processing system of claim 9, further comprising:

fifth program instructions to retrieve data about operations performed by at least one of the client computer, the first server computer, and the second and third server computers from a monitoring system; and sixth program instructions to identify the second and third requests made by the first server computer to the second and third server computers, respectively, to process the first request by the client computer to the first server computer in response to the first request by the client computer to the first server using the data retrieved from the monitoring system and context for the data, wherein the fifth and the sixth program instructions are stored on the computer-readable storage device for execution by the CPU in the computer-readable memory.

11. The data processing system of claim 9, wherein the first program instructions to identify the second and third requests made by the first server computer to the second and third server computers, respectively, to process the first request by the client computer to the first server computer in response to the first request by the client computer to the first server computer comprise:

program instructions to retrieve a log containing entries about operations performed by at least one of the client computer, the first server computer, and the second and third server computers from a monitoring system in which each entry in the log corresponds to an operation performed by the at least one of the client computer, the first server computer, and the second and third server computers; and program instructions to identify a set of related entries recorded in the log using context for the each entry in the log in which the set of related entries correspond to the second and third requests.

12. The data processing system of claim 11, wherein the second program instructions to correlate the second and third requests to the first request comprise:

program instructions to correlate the second and third requests that correspond to the set of related entries to the first request to form a pattern of access for the first server computer and the second and third server computers in which the pattern of access predicts that the other instances of the second and third requests will be sent to the second and third server computers, respectively, to process the first request by the client computer to the first server computer in response to the first request by the client computer to the first server computer.

13. The data processing system of claim 9, wherein the first program instructions to identify the second and third requests made by the first server computer to the second and third server computers, respectively, to process the first request by the client computer to the first server computer in response to the first request by the client computer to the first server computer comprise:

program instructions to retrieve data about operations performed by at least one of the client computer, the first server computer, and the second and third server computers from a monitoring system;

program instructions to determine whether the second and third requests occur within a threshold period of time from a time at which the first request is received by the first server computer and whether the second and third requests by the first server computer to the second and third server computers request information for use in processing the first request by the client computer to the first server computer; and program instructions to identify the second and third requests made by the first server computer to the second and third server computers as part of the processing by the first server computer of the first request by the client computer to the first server computer in response to at least one of a determination that the second and third requests occur within the threshold period of time from the time at which the first request is received by the first server computer and a determination that the second and third requests by the first server computer to the second and third server computers request the information for use in processing the first request by the client computer to the first server computer.

14. A computer program product for expediting processing of a request by a client computer, wherein the computer program product comprises a computer-readable storage device(s) and computer-readable program instructions stored on the computer-readable storage device(s) to manage copies of data objects in a network data processing system, wherein the computer-readable program instructions, when executed by a CPU:

identify second and third requests made by a first server computer to second and third server computers, respectively, to process a first request by the client computer to the first server computer in response to the first request by the client computer to the first server computer, wherein the second request is for data that is generated dynamically in response to the second request, the data being needed to process the first request;

correlate the second and third requests to the first request in response to the identification;

send another instance of the second request to the second server computer to dynamically generate data needed to process the first request and another instance of the third request to the third server computer before the first server computer send the other instances of the second and third requests to the second and third server computers, respectively, in response to processing by the first server computer of a subsequent instance of the first request by the client computer without the correlation of the second and third requests to the first request performed previously in response to the identification, to expedite processing of the subsequent instance of the first request made by the client computer responsive to the subsequent instance of the first request by the client computer to the first server computer, and based on the correlation of the second and third requests to the first request; and receive information from the second and third server computers in response to the other instances of the second and third requests, respectively, and send the information to the first server computer to expedite the processing of the subsequent instance of the first request.

15. The computer program product of claim 14, wherein the computer-readable program instructions, when executed by the CPU:

retrieve data about operations performed by at least one of the client computer, the first server computer, and the second and third server computers from a monitoring system; and identify the second and third requests made by the first server computer to the second and third server computers, respectively, to process the first request by the client computer to the first server computer in response to the first request by the client computer to the first server using the data retrieved from the monitoring system and context for the data.

16. The computer program product of claim 14, wherein in being executed to identify the second and third requests made by the first server computer to the second and third server computers, respectively, to process the first request by the client computer to the first server computer in response to the first request by the client computer to the first server computer, the computer-readable program instructions, when executed by the CPU:

retrieve a log containing entries about operations performed by at least one of the client computer, the first server computer, and the second and third server computers from a monitoring system in which each entry in the log corresponds to an operation performed by the at least one of the client computer, the first server computer, and the second and third server computers;

identify a set of related entries recorded in the log using context for the each entry in the log in which the set of related entries correspond to the second and third requests.

17. The computer program product of claim 16, wherein in being executed to correlate the second and third requests to the first request, the computer-readable program instructions, when executed by the CPU:

correlate the second and third requests that correspond to the set of related entries to the first request to form a pattern of access for the first server computer and the second and third server computers in which the pattern of access predicts that the other instances of the second and third requests will be sent to the second and third server computers, respectively, to process the first request by the client computer to the first server computer in response to the first request by the client computer to the first server computer.

* * * * *